No. 639,478. Patented Dec. 19, 1899.
G. WILSON.
INSTANTANEOUS WATER HEATER.
(Application filed June 5, 1899.)
(No Model.) 2 Sheets—Sheet 1.
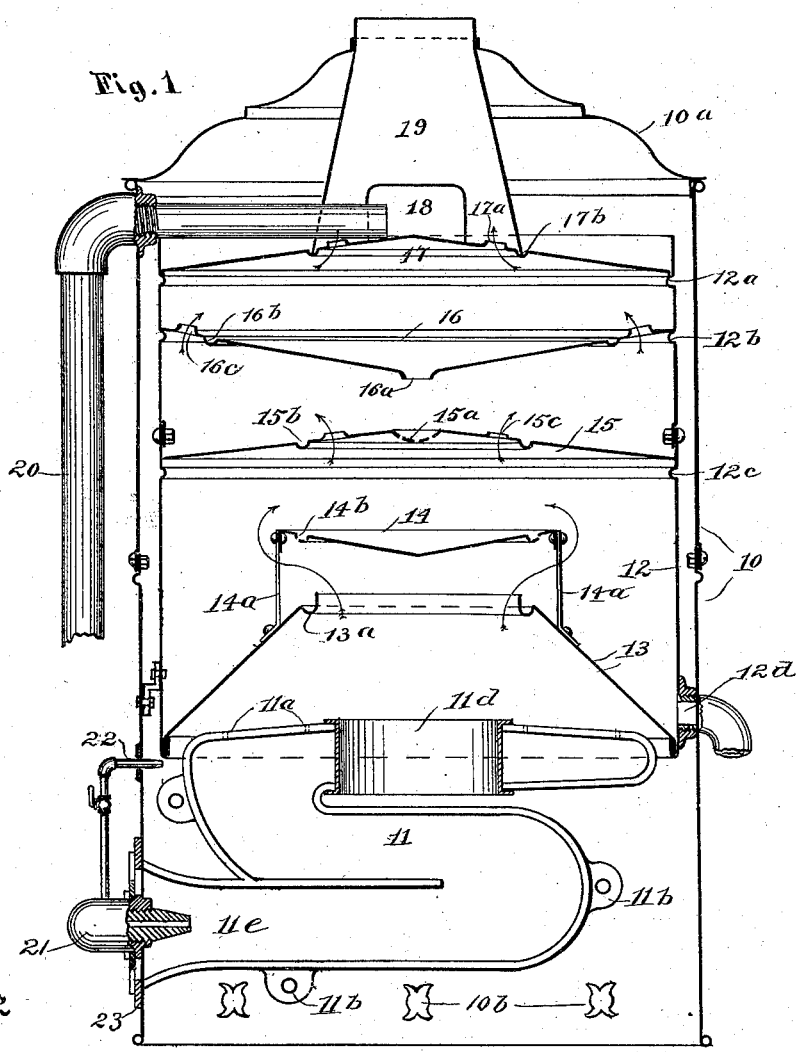
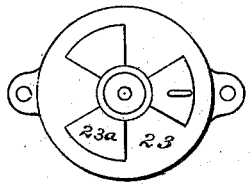
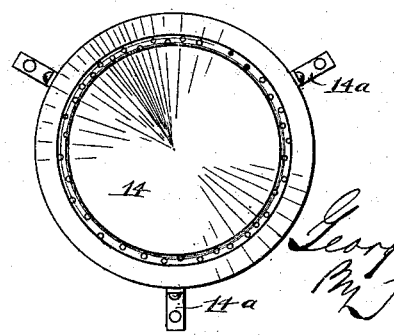
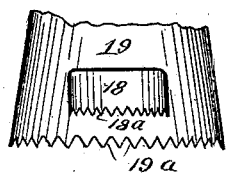
Witnesses:
G. S. Noble
J. Buehler
Inventor.
George Wilson
M F Benjamin
Att'y No. 639,478. Patented Dec. 19, 1899.
G. WILSON.
INSTANTANEOUS WATER HEATER.
(Application filed June 5, 1899.)
(No Model.) 2 Sheets—Sheet 2.
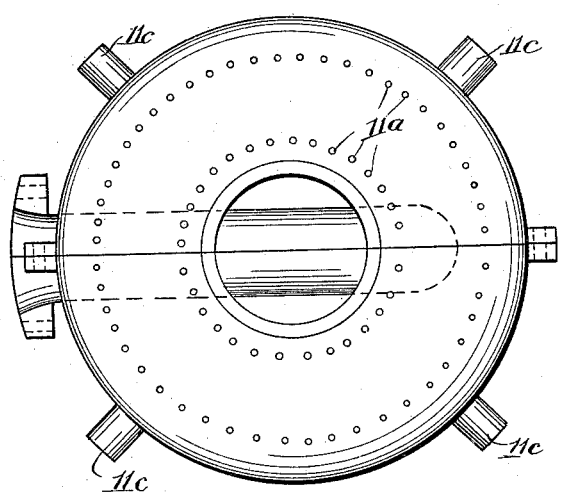
Fig. 5
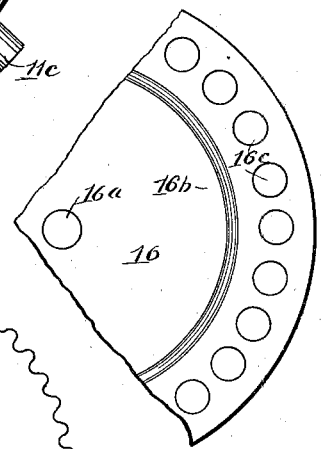
Fig. 9
Fig. 6
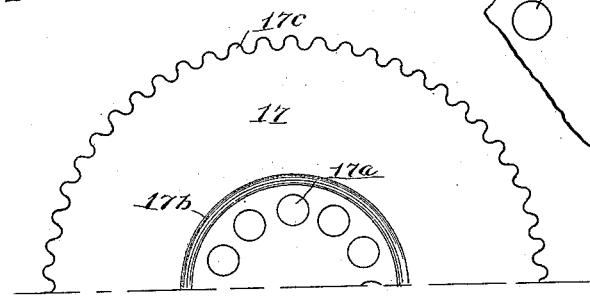
Fig. 7
Fig. 8
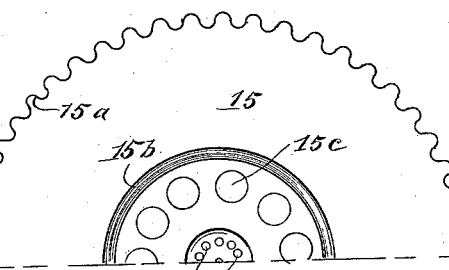

UNITED STATES PATENT OFFICE.

GEORGE WILSON, OF CHICAGO, ILLINOIS.

INSTANTANEOUS WATER-HEATER.

SPECIFICATION forming part of Letters Patent No. 639,478, dated December 19, 1899.

Application filed June 5, 1899. Serial No. 719,432. (No model.)

*To all whom it may concern:*

Be it known that I, GEORGE WILSON, a citizen of the United States, residing at Chicago, in the county of Cook and State of Illinois, have invented certain new and useful Improvements in Water-Heaters, of which the following is a specification.

My invention relates to improvements in that class of devices for heating water which are known generally as "instantaneous water-heaters" and which are used in combination with bath-tubs and sinks and in which the water is distributed over a large heated area in a short space of time, means being provided for the free circulation of both water and heated air.

The object of my improvements is to provide a device of this character which will combine with a simple construction advantages of thorough distribution of the water, quick circulation of the hot air, and a protection of the parts most exposed to the heat from the burner.

In the accompanying drawings, forming part of this application, I have shown my improvements in a heater in which the heat is furnished from a gas jet or burner; but it will be understood that I do not limit myself to such application, as the chief features of my invention are equally applicable to a burner having coal, gasolene, or other fuel.

In said drawings, Figure 1 is a vertical section of the heater complete. Fig. 2 is a detail in elevation of an air-draft regulator. Fig. 3 is a plan view of a water-pan. Fig. 4 is a detail in section of a cup and dome in the upper part of the heater. Fig. 5 is a top plan of the burner. Fig. 6 is a top plan view of one-half of the upper plate. Fig. 7 is a section of the plate shown in Fig. 6. Fig. 8 is a top plan view of one-half of the lower plate. Fig. 9 is a top plan view of a section of the middle plate.

Like reference-numerals indicate like parts in the several views.

Referring to the drawings, 10 represents a cylindrical jacket which surrounds the heater, is made of any suitable material, and is provided with a top or cover $10^a$ and near its lower edge with openings or perforations $10^b$, through which air is admitted for circulation around the burner. For convenience the jacket 10 is preferably made in two sections, which are bolted together, as shown. Secured in the lower part of the jacket by means of arms $11^c$ is an annular burner 11, made of iron and preferably cast in two sections secured together by means of bolts or rivets passing through suitable lugs $11^b$. The lower portion of the burner is formed with a branch pipe $11^e$, through which the combustible fluid is conducted to the burner, the outer end of said pipe being formed flaring and with its edges registering with an opening cut in the side of the jacket for the introduction of the gas-pipe nozzle 21. The top of the burner is provided with a double row of holes $11^a$, through which the gas escapes into the combustion-chamber formed between the burner and the dome 13. In the center of the burner is a collar $11^d$, through which the air passes upwardly into the said combustion-chamber. Circulation of air around the burner is secured by the fact that the diameter of the burner is less than the diameter of the inner cylinder 12, which surrounds the upper portion of the burner, as shown in Fig. 1.

The cylinder 12 is preferably formed in two sections, as shown, and is provided at different points with inwardly-bent annular ribs $12^a$, $12^b$, and $12^c$ to furnish supports for the top plate 17, middle plate 16, and lower plate 15, respectively. The lower edge of the cylinder is bent upwardly to embrace the lower edge of the dome 13 and therewith to form a tight joint. In the lower part of the cylinder is an opening $12^d$ for the introduction of the hot-water-discharge pipe or cock.

The dome 13 is formed with sloping sides, is open at the top, and around its upper edge is provided with an annular gutter or groove $13^a$. Supported over the open mouth of the dome by legs $14^a$ is a water-pan 14, in the bottom and near the outer edge of which is an annular groove $14^b$, which is perforated to permit the escape of the water from the pan upon the dome and into the gutter $13^a$ in said dome.

Resting on the rib $12^c$ is a circular plate 15, formed with corrugated or fluted edges $15^d$, having its center depressed and perforated, as at $15^a$, and provided with an annular groove $15^b$ and with a series of openings $15^c$, the latter being preferably formed by punching upwardly the metal, thus leaving raised edges, which prevent the water from running down through said openings in its flow over the surface of the plate. From the depressed center this plate slopes downwardly to its outer edge, thus causing the water to traverse the surface of said plate from center to circumference, except so much of it as escapes through the small openings in the center. Above the plate 15 and resting on the flange $12^b$ is a second plate 16, having a central opening $16^a$ and near its outer edge a plurality of upwardly-punched openings $16^c$ and with an annular groove $16^b$. The edges of this plate are plain, as shown in Fig. 9, so that all water dropped upon it escapes through the central opening $16^a$, the plate sloping toward such opening, and the upturned edges around the openings $16^c$ preventing the escape of any water therethrough. Above the plate 16 is the top plate 17, which is formed with a plurality of openings $17^a$, an annular groove $17^b$, and fluted outer edge $17^c$, the manner of forming the openings $17^a$ being the same as with the corresponding openings in the plates 15 and 16. Secured to the upper side of the plate 17 at its center is a cup 18, in one side of which is a suitable opening for the admission of the water-supply pipe 20. The lower edge of this cup is serrated or formed with teeth $18^a$, the spaces therebetween permitting the escape of the water upon the plate 17, over the surface of which it flows by gravity. Surrounding the cup 18 and having its lower edges resting in the groove $17^b$ of the plate 17 is a dome 19, having an open top and having an opening in its side for the passage of the pipe 20. The waste products of combustion or heated air pass out through this dome after traversing the cylinder from bottom to top in the direction and along the lines indicated by the arrows.

In order that the admission of air to the pipe $11^c$ may be regulated, I provide a plate 23, which fits over the opening in the side of the cylinder through which the pipe 21 passes, said plate having therein openings which are normally covered by a rotatable damper $23^a$, by which the size of the opening is regulated in a well-known manner. Extending upwardly from the gas-supply pipe 21 is a small pipe 22, provided with a suitable cock, and the upper end of said pipe extending within the cylinder at a point near the burner, said pipe serving as a pilot-tube for igniting the gas at the burner in a manner well known in devices of this character.

In operation water is conveyed to my improved heater through the pipe 20 from any suitable source of supply, the stream being thrown into the cup 18, from which it escapes, as heretofore described. The water then flows downwardly over the plate 17 into the groove $17^b$ under the edges of the dome 19 and falls from the corrugated periphery of said plate upon the plate 16 at its outer edge. After flowing into the groove $16^b$ it passes downwardly and out of the central opening $16^a$ upon the plate 15, which it strikes at the central depressed portion $15^a$, a portion of the water escaping through the small openings in said portion, but the greater part flowing over said plate and escaping at its edges. The water dropping through the depressed portion falls upon the pan 14 and escapes therefrom through the perforated groove $14^b$ to fall upon the dome 13 and into the groove or gutter $13^a$. The pan 14 being formed with its central portion below the plane of its perforated groove retains at all times some water on its surface, and is thus protected from the warping influence of the extreme heat to which it is subjected.

Having thus described my invention, what I claim as new, and desire to secure by Letters Patent, is—

1. A water-heater comprising a cylinder, a burner connected with said cylinder, a dome and a water-pan arranged above said burner and forming a combustion-chamber, and a series of inclined plates arranged within said cylinder and removably supported therein, said plates having formed therein annular grooves, and perforations for the passage of water and other perforations for the passage of hot air, substantially as set forth.

2. A water-heater comprising a cylinder, a burner connected with said cylinder, a dome and a water-pan arranged above said burner and forming a combustion-chamber, a series of plates removably arranged in said cylinder and oppositely inclined to each other, said plates having formed therein annular grooves, and perforations for the passage of hot air and other perforations for the passage of water, the plates having outwardly-inclined surfaces being provided with corrugated or fluted peripheral edges, substantially as described.

3. A water-heater comprising a cylinder, a burner connected with said cylinder, a dome positioned above said burner, a water-pan arranged above said dome and formed with a depressed central portion and with peripheral openings, and a series of plates oppositely inclined to each other and having formed therein annular grooves and openings for the passage of hot air and for the passage of water, substantially as set forth.

4. A water-heater comprising a cylinder, a burner connected with said cylinder, a dome positioned above said burner and having an open top and an annular gutter about said top, a water-pan arranged above said dome and formed with a depressed central portion and with annular perforations therein, and a series of inclined plates removably supported in said cylinder and being formed with openings for the passage of hot air and other openings for the passage of water, and some of said plates having corrugated peripheral edges, substantially as set forth.

5. A water-heater comprising a cylinder, a burner connected with said cylinder, a dome positioned above said burner and having an open top and an annular gutter about said opening, a water-pan arranged above said dome and formed with a depressed central portion and with annular perforations a plate arranged above said pan and removably supported in said cylinder, said plate being formed with corrugated peripheral edges, a central opening and with perforations for the passage of hot air and of water, a second plate having a central opening and with perforations for the passage of hot air and of water, a top plate having corrugated peripheral edges and perforations for the passage of hot air, all of said plates being provided with annular grooves therein and oppositely inclined to each other, and a cup secured to the top plate and provided with an opening for a water-supply pipe and with openings at its lower edges for the passage of water therefrom, and means for introducing water into said cup, substantially as set forth.

In testimony whereof I affix my signature in presence of two witnesses.

GEORGE WILSON.

Witnesses:
J. BUEHLER,
B. TERRY.